(12) United States Patent
Ryland et al.

(10) Patent No.: US 12,177,185 B1
(45) Date of Patent: Dec. 24, 2024

(54) CONTROLLING USE OF TEMPORARY CREDENTIALS USING NETWORK METADATA

(71) Applicant: Amazon Technologies, Inc., Seattle, WA (US)

(72) Inventors: Mark Ryland, Great Falls, VA (US); Joshua Benjamin Levinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 270 days.

(21) Appl. No.: 17/958,057

(22) Filed: Sep. 30, 2022

(51) Int. Cl.
*H04L 9/40* (2022.01)

(52) U.S. Cl.
CPC ...... *H04L 63/0272* (2013.01); *H04L 63/0236* (2013.01); *H04L 63/0876* (2013.01)

(58) Field of Classification Search
CPC ............. H04L 63/0272; H04L 63/0236; H04L 63/0876
See application file for complete search history.

(56) References Cited

U.S. PATENT DOCUMENTS

| | | | | |
|---|---|---|---|---|
| 8,438,654 B1 * | 5/2013 | von Eicken | ......... | G06F 9/45558 718/1 |
| 2019/0007366 A1 * | 1/2019 | Voegele | .............. | H04L 12/4633 |

OTHER PUBLICATIONS

Bengston, William, "Active Defense—Dynamically Locking AWS Credentials to Your Environment," Aug. 9, 2019, retrieved from Internet: https://medium.com/swlh/active-defense-dynamically-locking-aws-credentials-to-your-environment-47a9c920e704 on Jun. 11, 2023, 18 pages.

* cited by examiner

*Primary Examiner* — Huan V Doan
(74) *Attorney, Agent, or Firm* — Nicholson DeVos Webster & Elliott LLP

(57) ABSTRACT

Techniques are described for enabling users of a cloud provider network to create policies used to control the use of temporary security credentials by computing resources other than a computing resource to which the credentials were issued. An identity and access management service encodes, into temporary security credentials, information about the virtual private network to which the credentials are issued. When a computing resource subsequently issues requests to perform actions and uses the temporary security credentials to sign the request, the cloud provider network further adds, to the network traffic, information associated with the virtual private network from which the request originates. A user can then create a policy with a statement indicating that request are to be permitted only if, e.g., the identity of the virtual private network as encoded in the temporary security credentials matches the identity of the virtual private network identified by the information included in the request.

20 Claims, 9 Drawing Sheets

OPERATIONS
600

OBTAINING, BY AN IDENTITY AND ACCESS MANAGEMENT SERVICE OF A CLOUD PROVIDER NETWORK, A REQUEST TO PERFORM AN ACTION, WHEREIN THE REQUEST INCLUDES: TEMPORARY SECURITY CREDENTIALS ISSUED TO A COMPUTING RESOURCE, WHEREIN THE TEMPORARY SECURITY CREDENTIALS INCLUDE A SESSION TOKEN INCLUDING A FIRST NETWORK IDENTIFIER ASSOCIATED WITH THE COMPUTING RESOURCE, AND HEADER INFORMATION INCLUDING A SECOND NETWORK IDENTIFIER ADDED BY AN INTERMEDIARY NETWORK COMPONENT THAT IS SEPARATE FROM THE COMPUTING RESOURCE 602

IDENTIFYING A POLICY ASSOCIATED WITH THE REQUEST, WHEREIN THE POLICY INCLUDES A STATEMENT AUTHORIZING THE REQUEST BASED ON A COMPARISON OF THE FIRST NETWORK IDENTIFIER AND THE SECOND NETWORK IDENTIFIER 604

AUTHORIZING OR DENYING THE REQUEST TO PERFORM THE ACTION BASED ON THE COMPARISON OF THE FIRST NETWORK IDENTIFIER AND THE SECOND NETWORK IDENTIFIER 606

CONTROLLING USE OF TEMPORARY CREDENTIALS USING NETWORK METADATA

BACKGROUND

A cloud provider network enables users to use a variety of computing-related resources such as compute resources, storage resources, networking resources, and the like. When a user or application interacts with a cloud provider network (e.g., using an application programming interface (API) or command line interface (CLI) provided by the cloud provider network), the user or application typically is required to specify security credentials to indicate who the user or application is and whether the user or application has permission to access the requested resources. A cloud provider network in turn uses the security credentials to authenticate and authorize the user or application to perform various actions. The security credentials can include, for example, usernames and passwords, access keys, or the like.

BRIEF DESCRIPTION OF DRAWINGS

Various examples in accordance with the present disclosure will be described with reference to the drawings, in which:

FIG. 6 is a flow diagram illustrating operations of a method for authenticating a request including temporary security credentials by comparing information encoded in a session token with information included in a header of network traffic carrying the request according to some examples.

DETAILED DESCRIPTION

Figure 1:
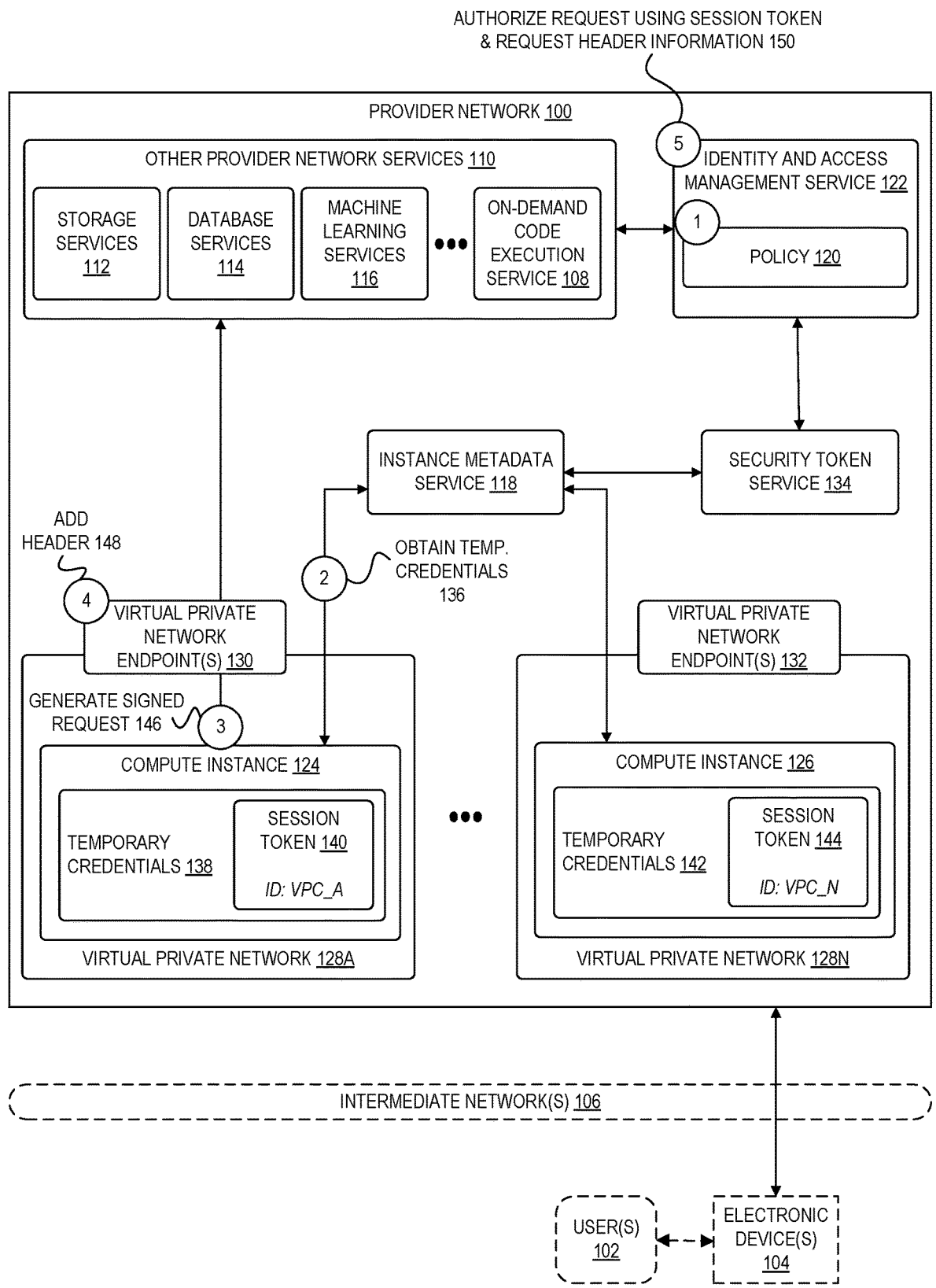
FIG. 1 is a diagram illustrating an environment in which users can configure controls on the use of temporary security credentials by computing resources other than a computing resource to which the credentials were issued according to some examples.

The present disclosure relates to methods, apparatus, systems, and non-transitory computer-readable storage media for enabling users of a cloud provider network to create policies used to control the use of temporary security credentials by computing resources other than a computing resource to which the credentials were issued. According to examples described herein, when issuing temporary security credentials to a computing resource (e.g., to be used by a role assumed by a compute instance, a software application, or other resource), an identity and access management service encodes, into the temporary security credentials, information about the virtual private network of which the computing resource is a part (or encodes other network metadata related to the computing resource). When the computing resource subsequently issues requests to perform actions (e.g., to launch compute instances, access stored data objects, etc.) and uses the temporary security credentials to sign the request, the cloud provider network further adds, to the network traffic, information associated with the virtual private network from which the request originates (such as, e.g., an identifier of an endpoint used to route traffic out of the virtual private network). A user can then create a policy with a statement indicating that the identity and access management service is to permit requests only if, e.g., the identity of the virtual private network as encoded in the temporary security credentials matches the identity of the virtual private network identified by the information included in the request (or using other comparisons involving network metadata encoded into temporary credentials). In this manner, users can ensure that temporary security credentials provided to a computing resource in a virtual private network cannot be used outside of the virtual private network (e.g., by an entity that obtained the temporary security credentials via an inadvertent leak of the credentials or via malicious actions), thereby increasing the security of the credentials and users' cloud resources more generally.

Cloud provider networks enable users to use a variety of computing-related resources such as compute resources, storage resources, networking resources, and the like. User and software application interactions with a cloud provider network (e.g., using an application programming interface (API), command line interface (CLI), or web-based console) typically involve the specification of security credentials (usernames and passwords, access keys, etc.) used by the cloud provider network to verify who the user or application is and whether the user or application has permission to access the requested resources. In this context, access keys can refer to long-term security credentials consisting of two parts: an access key identifier and a secret access key. Like a username and password, access keys can be used by a user or application when sending requests to a cloud provider network so that an identity and access management service can authenticate the user or application. In some cases, the use of access keys can be more secure than using usernames and passwords in part because the access keys are not human-generated, and a secret access key typically does not need to be sent directly as part of a request and can instead be used to digitally sign requests, thereby reducing the possibility of the credentials being exposed to unauthorized third parties.

Although the use of long-term access keys may improve security in some cases compared to the use of usernames and passwords, long-term access keys are nevertheless susceptible to security issues. As indicated above, users and software applications interacting with a cloud provider network are typically required to provide appropriate security credentials with their API requests and other interactions. To enable a software application to generate such requests programmatically, a software developer might store a set of long-term access keys directly within their application, or within metadata associated with a compute instance upon which the application is executing, to allow the application to use those credentials. Developers are then required to manage the credentials directly to ensure that the long-term credentials remain secure, that the credentials are securely passed to an application or compute instances hosting an application upon launch, and that the application or instance is updated when credentials are rotated. Despite best efforts to safeguard such access keys, these processes may often expose the access keys to mishandling and inadvertent leaking to unauthorized third parties. Once in the possession of an unauthorized third party, access keys can be used to impersonate the actual owner of the credentials, enabling a malicious actor to perform undesirable actions and to misuse computing resources associated with the authorized owner.

For the foregoing reasons and others, it is often considered best practice to use temporary security credentials rather than long-term access keys when possible. Temporary security credentials can be used in largely the same manner as long-term access keys credentials except that temporary security credentials are short term and can be configured to last anywhere from seconds to multiple hours, or any other defined period. Once temporary security credentials issued by a cloud provider network expire, the cloud provider network no longer recognizes the credentials or allows access from API requests associated with the credentials. In some examples, an application or user may not permanently store temporary security credentials but instead obtain the credentials from a cloud provider network upon request. When or before a set of temporary security credentials expires, a user or application can request new temporary credentials, if desired. Among other benefits, the limited lifespan of temporary security credentials alleviates users and applications from needing to rotate or explicitly revoke credentials when the credentials are no longer needed. Furthermore, after temporary security credentials expire, the credentials cannot be reused and therefore are less susceptible to long term misuse if inadvertently exposed.

In some examples, a set of temporary security credentials includes an access key identifier, a secret access key, and additionally a security token (sometimes also referred to as a session token). As indicated above, the access key identifier and secret access key associated with temporary security credentials operate similarly to the use of access key identifiers and secret access keys associated with long-term access key credentials. In some examples, a security token encodes session information related to the associated temporary access keys, and the token is provided with requests sent by the user or application to which the temporary security credentials are issued. In some examples, the session information encoded by a security token can include, for example, an indication of when the session expires, an identity of the owner of the credentials, a set of permissions or a security role associated with use of the credentials, and the like. The security token can be encrypted to provide secrecy between an application or user using the token and the cloud provider network and is often digitally signed so that the cloud provider network can verify the integrity of the token (e.g., by using a secure one-way hashing function to verify that the token is not modified once issued by the provider network). In this manner, a security token provides for the establishment of a security credential session between a user or application to which the credentials are issued and the cloud provider network.

While the use of temporary security credentials may even further improve the security of using access key-based authentication in some cases, temporary credentials are also susceptible to mishandling and inadvertent exposure to unauthorized third parties. Although any given set of temporary security credentials automatically expires after a defined period, if obtained by a malicious third party, the temporary credentials still can be misused for the remainder of a credential session. Furthermore, because temporary security credentials act in much the same manner as long-term access key credentials, the credentials generally can be used by any entity and from any network location. As a result, a malicious entity with stolen temporary security credentials can use the credentials to impersonate the actual owner of the credentials from virtually any location, making it relatively easy to exploit temporary security credentials once obtained.

Another challenge with providing temporary security credentials or other authentication material to computing resources in a cloud provider network is that the computing resources typically do not possess credentials at the outset with which to obtain the temporary credentials. Processes for obtaining credentials are thus often restricted in various ways such as, for example, by ensuring that requests for temporary security credentials originate from only restricted network locations, by using a particular sequence of network calls that are unlikely to be forwarded by any proxying software, by ensuring that only certain processes can access a source of the temporary security credentials, and the like. However, ultimately any software or user with access to a computing resource having sufficient local privileges can obtain and potentially exfiltrate temporary security credentials, increasing the desirability of providing controls around the use of such credentials.

These challenges, among others, are addressed by the described techniques for enabling users to control the use of temporary security credentials to the virtual private network (or to the specific computing resource or other defined network boundary) to which the credentials were issued. In some examples, a security token service used to generate credentials encodes information into the associated security tokens identifying information about the computing resource to which the credentials are issued. This information can include, for example, an identifier of a virtual private network (or "virtual private cloud") containing the computing resource, a private Internet Protocol (IP) address of the computing resource, a public IP address of the computing resource, and the like.

Virtual private networks provided by a cloud provider often further include networking elements used to route requests from virtual private network resources to external services of the cloud provider network and to other locations. In some examples, those networking elements add header information (e.g., using the Proxy Protocol or other mechanisms) identifying a source of the request (e.g., a private Internet Protocol (IP) address) and identifying the networking element proxying the request out of the virtual private network. Users can then create access policies that compare the information encoded in security tokens (e.g., identifying a virtual private network, a private or public IP address of the computing resource to which the credentials were issued, etc.) to the header information added to requests (e.g., identifying a virtual private network, a virtual private network endpoint, or a private or public IP address of the computing resource from which a request originates). A policy can authorize requests, for example, only if the private IP address, public IP address, virtual private network identifier, or combinations thereof, included in the security token and header information matches, thereby preventing the use the security credentials outside of a virtual private network or other defined network boundary to which the credentials were issued. In this manner, users can create policies controlling the use of temporary security credentials such that a single policy can be applied broadly across any number of different computing resources, virtual private networks, users and roles, etc., improving the security of the credentials and users' resources generally.

FIG. 1 is a diagram illustrating an environment in which a software application obtains and uses temporary security credentials to interact with a cloud provider network according to some embodiments. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users (e.g., users 102) can user electronic device(s) 104 to interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide can be referred to as a "managed compute service." A managed compute service generally executes code or provides computing resources for its users in a managed configuration. Examples of managed compute services include, for example, an on-demand code execution service 108, a hardware virtualization service, a container service, or the like. FIG. 1 further illustrates other provider network services 110 including a storage service 112, a database service 114, a machine learning service 116, among many other services that a provider network 100 may provide.

An on-demand code execution service 108 (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service 108 by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, or a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated above, it is often desirable for computing resources, software applications, and users to use temporary security credentials to interact with a cloud provider network 100. Due in part to possible security issues that can arise if temporary security credentials are stolen or inadvertently leaked, users further desire the ability to control the use of temporary security credentials by computing resources other than a computing resource to which the credentials are issued. The numbered circles "1"-"5" in FIG. 1 illustrate a process involving the creation of a policy 120 to control the use of temporary security credentials, a compute instance (or more generally any software running on the compute instance) obtaining temporary security credentials that can be used to authenticate and authorize requests sent by the compute instance to various services and other components of a cloud provider network 100, and an identity and access management service 122 authorizing the requests based on the policy 120. As described in more detail herein, an identity and access management service 122 encodes information about a virtual private network containing the computing resource to which the temporary security credentials are issued. This encoded information can be used by the identity and access management service 122 to ensure that requests including the temporary security credentials originate from the same virtual private network (or from a same specific compute instance, subnet range, etc.), thereby helping to ensure that lost or stolen temporary credentials cannot be used by entities with unintended access outside of the virtual private network.

In some examples, a cloud provider network 100 includes an identity and access management service 122 by which an entity, such as a user or software application, can issue actions or operations. The identity and access management service 122 can be one or more software applications or programs executed by the processors of one or more computer systems of the provider network 100. The identity and access management service 122 generally provides identity and access management for the provider network 100 by authenticating users and managing sessions with services and resources of the provider network 100. For example, a user can authenticate with the provider network 100 through the identity and access management service 122 via an interface such as a CLI, a console implemented as a website or application, an API, etc. Using the identity and access management service 122, users can create and manage users and groups, and configure permissions to allow and deny users access to cloud provider network resources.

In some examples, users can run software applications on compute instances provided by a hardware virtualization service of the cloud provider network 100 (e.g., a compute instance 124, a compute instance 126, etc., each executing on one or more computing devices managed by the hardware virtualization service) and the operation of the software applications involves accessing other cloud provider resources (e.g., provided by other provider network services 110 including any of a storage service 112, a database service 114, a machine learning service 116, an on-demand code execution service 108, etc.). Although FIG. 1 illustrates an example of a software application executing on a compute instance, in other examples, a software application executes as a container using a container service of the cloud provider network 100, as code executed by an on-demand code execution service 108, or more generally the software application can be any type of executable computing resource executed on hardware provided by the provider network 100.

As shown in FIG. 1, computing resources can belong to virtual private networks managed by users of the provider network 100 (e.g., compute instance 124 is part of virtual private network 128A, while compute instance 126 is part of virtual private network 128N). Each of the virtual private networks shown in FIG. 1 can be associated with a same user account, different accounts of a same organization, or by different tenants of the provider network 100 entirely. A virtual private network broadly enables users to launch provider network resources (e.g., compute instances, database instances, networking resources, etc.) into a defined virtual network. A virtual private network resembles a traditional network operated in users' on-premises data centers or other computing environments. The configuration of a virtual private network can include, for example, subnets into which computing resources can be deployed, Internet Protocol (IP) addressing (e.g., whether to use Internet Protocol version 4 (IPv4) or Internet Protocol version 6 (IPv6) addresses), route tables, gateways and endpoints, and the like.

In some examples, one type of virtual private network configuration includes the configuration of a virtual private network endpoint used to provide private connections between virtual private network resources and other provider network services 110 of the cloud provider network 100. As shown in FIG. 1, the virtual private network 128A includes one or more virtual private network endpoint(s) 130, while virtual private network 128N includes one or more virtual private network endpoint(s) 132. With a virtual private network endpoint, network traffic originating from a compute instance in a virtual private network and destined for another service is resolved to the private IP addresses of the endpoint network interfaces using Domain Name Services (DNS), and then sent to provider network service using a private connection between the virtual private network endpoint and the provider network service.

In some examples, a virtual private network endpoint implements a protocol (e.g., the PROXY protocol v1 or v2) used to transport connection information (e.g., a private IP address the source requesting the connection, an IP address or other identifier of the virtual private network endpoint, etc.) across the virtual private network endpoint (and possibly other intermediary networking devices). For example, a virtual private network endpoint can add a human-readable or binary header to the request header of network traffic proxied by the virtual private network endpoint, where the header information can include a source IP address (e.g., of the compute instance generating a request), an address of the endpoint, and so forth. The header is then sent as part of the request and can be analyzed by components receiving the request (e.g., by the identity and access management service 122, as described in more detail hereinafter).

As indicated above, software running on a compute instance generally uses security credentials to authenticate requests sent to the cloud provider network 100. In the example of compute instances provided by a hardware virtualization service, the hardware virtualization service can provide the compute instances with temporary security credentials that are then made available to applications running on the instance. In addition to compute instances provided by a hardware virtualization service, temporary security credentials can be provided to and used by computing resources associated with other types of cloud provider services including, but not limited to, batch computing services, container services, machine learning services, on-demand code execution services, object storage services, database services, management and governance services, security services, mobile services, networking and content delivery services, media services, analytics services, application integration services, satellite services, Internet of Things (IoT) services, blockchain services, and the like. In other examples, a software application obtains security credentials using identity federation. For example, a software application may use an X.509 certificate or other authentication mechanism to authenticate to an identity provider (IDP) system associated with an entity that is separate from the cloud provider network 100, wherein the IDP is then able to obtain security credentials from the cloud provider network 100 on behalf of the software application and to provide the credentials to the application upon request. Thus, the software application may generally be provided with credentials as needed, whether from an instance metadata service 118 of a hardware virtualization service (or other service supporting execution of a computing resource using the temporary credentials), a security token service 134, or from the cloud provider network 100 via a separate IDP system using identity federation.

A software application running on a compute instance (e.g., a compute instance 124) can generally include any software application that interacts with one or more services or components of the cloud provider network 100 during operation. A software application, for example, can be web application, standalone application, or other type of application implementing virtually any type of application functionality. For example, a software application running on a compute instance may implement a web application that further interacts with one or more database services, storage services, networking services, etc., of the provider network 100 during operation. In some examples, a software application may be implemented as a distributed or microservice-based software application that includes multiple interworking software components. The software running on a compute instance may be developed and maintained by any user of the provider network 100, by an operator of the cloud provider network 100, or by any other entity.

In some examples, software running on a compute instance includes functionality implemented in part by a software development kit (SDK) or other software development resources provided by an operator of the cloud provider network. For example, an operator of a cloud provider network 100 may provide any number of SDKs for various programming languages and development environments, where such SDKs generally enable users to readily develop applications that interact with and use resources and services of the cloud provider network 100. A cloud provider network SDK may include, for example, APIs, code samples, documentation, and other resources that enable user applications to perform such interactions. In the context of FIG. 1, the software libraries can include functionality that manages processes related to obtaining security credentials (e.g., including temporary security credentials) on behalf of a user application (e.g., from an instance metadata service 118, security token service 134, IDP, or other source) and providing the credentials to the user application for use, as described in more detail herein.

As indicated, it is desirable to provide users with the ability to control the use of temporary security credentials. In FIG. 1, at circle "1," a policy 120 is created to restrict the use of temporary security credentials by computing resources other than a computing resource to which the credentials were issued. In some cases, users may desire to ensure that temporary security credentials issued to a compute instance located in a user's virtual private network can only be used within the virtual private network to which the credentials were issued, by only a specific computing resource to which the credentials were issued, or the like.

In some examples, an identity and access management service 122 can provide policy variables, sometimes referred to as context keys, that users can use in a policy to specify certain conditions for allowing/denying requests. The identity and access management service 122 can resolve the variables contained in a policy using various pieces of information contained a request context associated with a request analyzed by the identity and access management service 122. For example, the identity and access management service 122 can provide policy variables corresponding to a date and time of a request, to an account to which a requesting principal (e.g., a user or role) belongs, and so forth. In some examples, specific services of a cloud provider network can also be associated with policy variables that can be used in policies. A hardware virtualization service, for example, can be associated with policy variables identifying a compute instance identifier, an owner of the compute instance, etc.

According to examples described herein, an identity and access management service 122 provides new policy variables that can be used to compare information about temporary security credentials issued to a computing resource and information about a request signed using temporary security credentials. The policy variables can include, for example, a policy variable that resolves to an identifier of a virtual private network to which temporary security credentials were issued, a policy variable that resolves to a combination of a virtual private network to which temporary security credentials were issued and a private Internet Protocol (IP) address of the computing resource, a policy variable that resolves to a combination of a virtual private network to which the temporary security credentials were issued and a public Internet Protocol (IP) address of the computing resource, etc. As indicated above, the identity and access management service 122 can resolve the policy variables using information obtained from a request context, including information derived from a session token included with the request, from header information added by an intermediary network component (e.g., a virtual private network endpoint) that is separate from a computing resource generating the request, etc.

The following is an example of a policy that can be applied to prevent the use of temporary security credentials unless the request arrived via a virtual private network endpoint in the same virtual private network to which the credentials were issued:

```
{
  "Version": "2012-10-17",
  "Statement": [
    {
      "Sid": "RequireUseOfVpcEndpoint",
      "Effect": "Deny",
      "Action": "*",
      "Resource": "*",
      "Condition": {
        "StringNotEquals": {
          "csp:SourceVpc": ${"hvs: InstanceSourceVpc"}
        }
      }
    }
  ]
}
```

In the example policy above, the statement includes a comparison of policy variable that is resolved using information derived from header information included with the request (e.g., the "csp:SourceVpc" variable) and information derived a session token included with the request (e.g., the "hvs:InstanceSourceVpc" variable).

The following is an example of a policy that can be applied to prevent the use of temporary security credentials unless the request arrived via a same compute instance to which the credentials were issued:

```
{
  "Version": "2012-10-17",
  "Statement": [
    {
      "Sid": "RequireUseOfVpcEndpoint",
      "Effect": "Deny",
      "Action": "*",
      "Resource": "*",
      "Condition": {
        "StringNotEquals": {
          "csp:SourceVpc": ${"hvs: InstanceSourceVpc"}
        },
        "StringNotEquals": {
          "csp: VpcSourceIp": [
            ${"hvs: InstanceSourcePrivateIPv4"},
            ${"hvs: InstanceSourceIPv6"}
          ]
        }
      }
    }
  ]
}
```

In the example policy above, the statement includes a comparison of policy variable that is resolved using information derived from header information included with the request and identifying a virtual private network (e.g., the "csp:SourceVpc" van able) and information derived a session token included with the request identifying a virtual private network (e.g., the "hvs:InstanceSourceVpc" variable). The policy statement further includes a comparison of a policy variable identifying a private source IP address of the compute instance generating the request (e.g., the "csp: VpcSourceIp" variable) with a policy variable identifying a private source IP address as derived from the included session token (e.g., "hvs:InstanceSourcePrivateIPv4" for an IPv4 address, or "hvs:InstanceSourceIPv6" for an IPv6 address).

In some examples, users can create a policy 120 using an interface of the identity and access management service 122. In other examples, the policy 120 can be automatically created for a user responsive to an indication that the user desires to control the use of temporary security credentials. For example, a user can generate a request to implement temporary security credential controls for an account or organization of the cloud provider network. The identity and access management service 122 can then create in whole or in part the policy 120 including a statement authorizing requests based on the comparison of a first network identifier derived from header information included with requests (e.g., a virtual private network identifier, a virtual private network endpoint identifier, a compute instance IP address or other identifier) and a second network identifier included with a session token (again, e.g., a virtual private network identifier, a virtual private network endpoint identifier, a compute instance IP address or other identifier of a resource to which the credentials were issued). In some examples, the policy 120 is a service control policy that applies to an organization of accounts of the cloud provider network.

In FIG. 1, at circle "2," a compute instance 124 obtains 136 a set of temporary security credentials 138 to be included in requests sent to services or other components of the cloud provider network 100 during execution of the application. In some examples, a software application can include software libraries used to automatically obtain the security credentials 138 responsive to the application generating a request (e.g., responsive to the application generating a function call or API request). In other examples, a software application can be configured to obtain the temporary security credentials 138 automatically and without explicit request from a user application. As shown, the temporary credentials 138 include a session token 140, where the session token encodes information about the virtual private network (and possibly about the compute instance 124 or other components) into the token. As shown, compute instances in other virtual private networks (e.g., compute instance 126) may from time to time obtain separate temporary credentials 142, where those temporary credentials include a session token 144 encoding information about a different virtual private network to which the credentials are issued.

Figure 2:
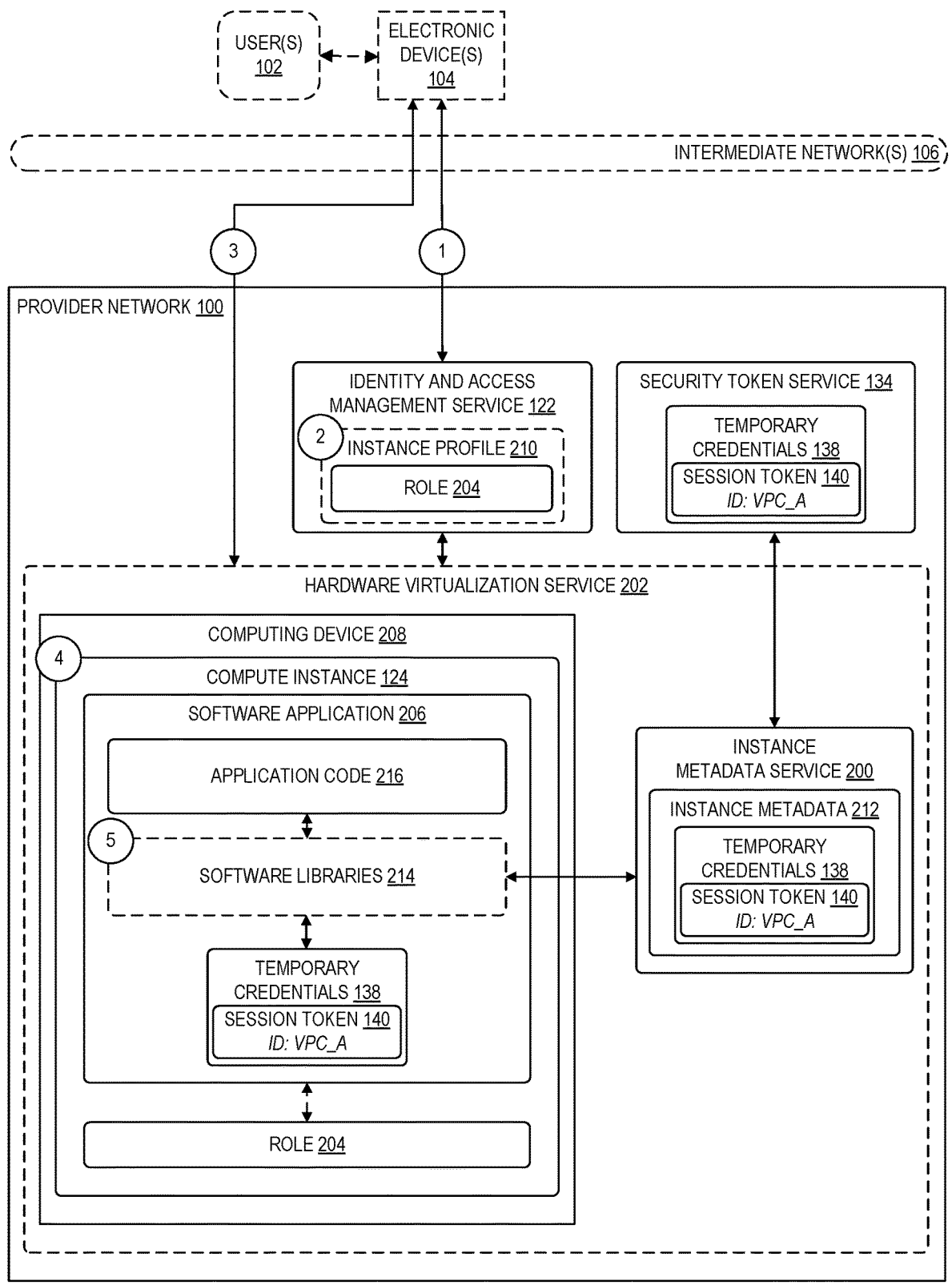
FIG. 2 is a diagram illustrating a compute instance provided by a hardware virtualization service obtaining, from an instance metadata service, temporary security credentials including a session token encoding data that can be used to control the use of the credentials according to some examples.

In some examples, a hardware virtualization service provides an instance metadata service from which computing devices upon which a compute instance (e.g., compute instance 124) is executing can obtain temporary security credentials, and where software applications running on the instance can then use the obtained temporary security credentials (e.g., based on the security credentials storage in locally accessible instance metadata containing the credentials). FIG. 2 illustrates additional details of an example environment in which a software application running on a compute instance obtains temporary security credentials via an instance metadata service of a hardware virtualization service. Although FIG. 2 illustrates an example of an instance metadata service provided by a hardware virtualization service, similar techniques can be used by other types of services that provide computing resources such as a container service, on-demand code execution service, and the like.

The numbered circles "1"-"5" in FIG. 2 illustrate an example process in which a compute instance 124 automatically obtains temporary security credentials 138 from an instance metadata service 200 of a hardware virtualization service 202 based on the attachment of a "role" 204 to the compute instance 124, where the obtained temporary security credentials 138 can then be used by a software application 206 executing on the compute instance 124. A compute instance 124 can obtain temporary security credentials based on the attachment of a role at the time the instance is launched or once the instance is running. The role thus enables user applications running on the instance to obtain temporary security credentials from instance metadata at the computing device 208 that can then be used to sign API requests.

In some embodiments, at circle "1" in FIG. 2, a user requests the creation of a role, and optionally an instance profile, and at circle "2," the identity and access management service 122 stores data representing the created role, instance profile, or both. In some embodiments, a "role" is an identity that a user can create using an identity and access management service 122 in association with a user account, where the role is associated with a specified set of permissions. Whereas an account is typically associated with one person, a role may be assumable by anyone or any application with permissions to do so. In some examples, a role may not be associated with standard long-term credentials, such as a password or access keys, but rather a user or application assuming a role is provided with temporary security credentials for the role session, as described herein.

As indicated, in some examples, an identity and access management service 122 of a cloud provider network 100 enables users to create security "roles" that can be attached to compute instances, where such security roles enable applications running on the instances to obtain temporary security credentials. As further indicated above, these temporary security credentials can be used to make API requests and to perform other actions in a manner similar to the use of long-term credentials. Thus, when using a role, long-term credentials (such as a username and password or access keys) need not be distributed to a compute instance or software application running on the compute instance. Instead, the attached role supplies temporary permissions that applications can use when making calls to other cloud provider services and resources.

In some examples, using roles to grant permissions to applications that run on a compute instance further involves the creation of an instance profile 210. For example, because a software application running on a compute instance is abstracted from the cloud provider network 100 by a virtualized operating system, an instance profile may be used to assign a role 204 and its associated permissions to a compute instance (e.g., compute instance 124) and to make the permissions available to the instance's software applications (e.g., software application 206). In some examples, an instance profile 210 contains a role 204 and can provide the role's temporary security credentials to applications that run on an instance to which the profile is attached. Those temporary security credentials can then be used, for example, in the application's API calls to access resources and to limit access to only those resources that policies associated with the role 204 permits. In some examples, only one role 204 can be assigned to compute instance at a time and all applications on the instance share the same role and permissions; in other examples, multiple roles can be assigned to an instance and used independently by various applications on the instance as appropriate.

As an example, consider a developer creating a software application 206 to be executed on a compute instance 124 and that involves access to a particular storage resource provided by an object storage service of the cloud provider network 100. In this example, a user may create a role 204 associated with permissions that enable read-only access to the storage resource and attach the role to the instance 124 (e.g., by launching the instance 124 with an identification of an instance profile 210 that contains the role 204). The role 204 also includes a trust policy that allows a compute instance 124 to assume the defined role 204 and to retrieve temporary security credentials 138 associated with the role 204. When an application 206 then runs on the instance 124, the application 206 can use the role's temporary security credentials 138 to access the specified storage resource. In this manner, an administrator need not grant a developer of the application permission to access the storage resource, and the developer need not share or manage credentials for the application 206.

Returning to FIG. 2, in some embodiments, at circle "3," the hardware virtualization service 202 receives a request to launch an instance (e.g., compute instance 124), wherein the request identifies a role 204 to be attached to the instance. As indicated above, in some embodiments, a role is identified based on a specified instance profile 210 that contains the role 204. In some embodiments, at circle "4," the hardware virtualization service obtains the identified role 204 or instance profile 210 from the identity and access management service 122, attaches the role 204 to the launched instance 124, and causes temporary security credentials 138 to be injected into instance metadata 212 for the instance as managed by an instance metadata service 200. In some examples, the temporary security credentials 138 are obtained from a security token service 134 based on the instance profile 210 or role 204 information. In some examples, the security token service 134 is a web service that enables users and applications to request temporary security credentials for users and roles associated with the identity and access management service 122. The security token service 134 can encode information into the session token 140 based on information obtained from the instance metadata service 200 and known about the requesting compute instance 124 such as, e.g., an identifier of the compute instance, a private IP address of the compute instance, a virtual private network in which the compute instance is located, identifiers of one or more virtual private network endpoints in the virtual private network, a public IP address of the compute instance 124, and the like.

In some examples, at circle "5" in FIG. 2, the software application 206 executes on the compute instance 124 and the software libraries 214 obtain the temporary security credentials 138 from the instance metadata service 200 upon request from functionality in the application code 216. In some examples, a software application 206 running on an instance 124 retrieves the temporary security credentials 138 provided by the role by accessing a specific instance metadata item (e.g., "iam/security-credentials/role-name"), which may be associated with a specific URL and locally accessible at the compute instance 124. Based on the obtained temporary security credentials 138, the application 206 is granted the permissions for the actions and resources that have been defined by the role 204 through the temporary security credentials 138 associated with the role. As indicated, these temporary security credentials 138 expire after a defined period and are rotated automatically. In some examples, application code 216 making use of the temporary security credentials 138 need not explicitly obtain the temporary security credentials 138—instead, the application code 216 may rely on the second functionality implemented by the software libraries 214 (e.g., provided by SDKs) to automatically obtain the credentials from the instance metadata service 200 and use them when generating requests.

Returning to FIG. 1, at circle "3," the compute instance 116 generates and signs a request 146 using the temporary security credentials 138. In this example, the request is directed to a service of the provider network 100 for which a virtual private network endpoint 130 has been configured, where the request generally can be for any action supported by the destination service. At circle "4," the virtual private network endpoint 130 adds 148 header information including one or more identifiers of the source compute instance 124 (e.g., a private IPv4 or IPv6 address), of the virtual private network 128A, of the virtual private network endpoint 130, and the like. As indicated, the virtual private network endpoint 130 can add the header information using the PROXY protocol or other mechanism for adding information into the request headers. In some examples, at circle "5," the identity and access management service 122 authorizes 150 the request based on the policy 120, a session token included with the token (including the encoded credential information), and the header information added by the virtual private network endpoint 130.

Figure 3:
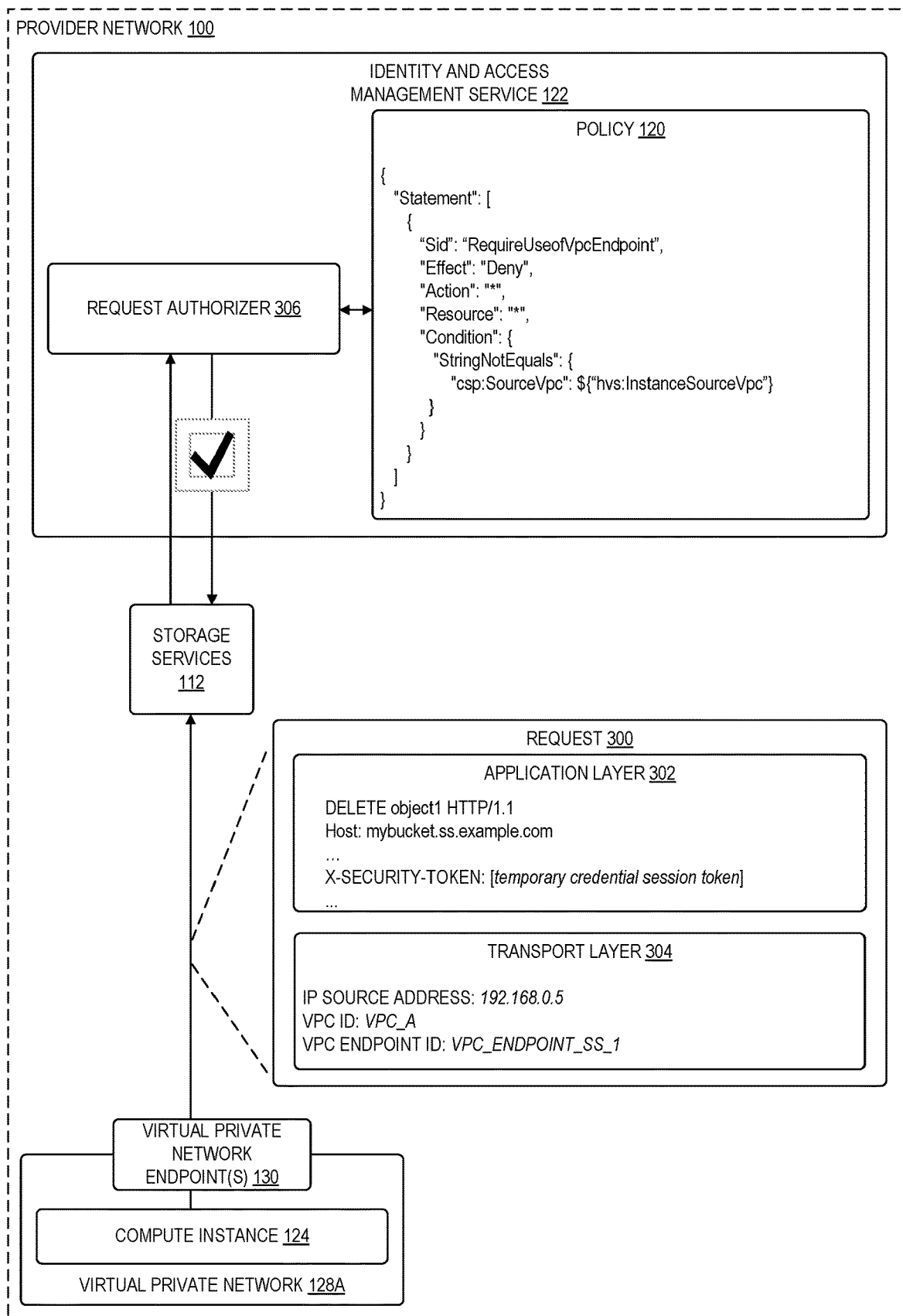
FIG. 3 is a diagram illustrating an identity and access management service authorizing a request based on information contained in both a session token included with temporary security credentials and in header information added by a virtual private network endpoint according to some examples.

FIG. 3 is a diagram illustrating an identity and access management service authorizing a request based on information contained in both a session token included with temporary security credentials and in header information added by a virtual private network endpoint according to some examples. In FIG. 3, the compute instance 124 has generated a request 300 including application layer 302 information and transport layer 304 information. As shown, the application layer 302 information includes a header specifying the session token associated with the temporary security credentials used to sign the request 300. As discussed, the session token is encoded with one or more first network identifiers associated with the compute instance 124 (e.g., a private IP address, a virtual private network endpoint 130 identifier, a virtual private network 128A identifier, etc., or other information about the virtual private network to which the credentials were issued). The virtual private network endpoint 130 had further added header information to the transport layer 304 including one or more second network identifiers associated with the compute instance (e.g., a private IP address of the source compute instance, identifier of the virtual private network endpoint 130, or other information about the source of the request 300).

In some examples, a request authorizer 306 component determines whether the request 300 is authorized before sending the request to a downstream service. In this example, the policy 120 includes a statement indicating that the request is to be denied if a source virtual private network of the request 300 (e.g., as indicated in the transport layer 304 information) does not match the virtual private network of the compute instance 124 to which the credentials were issued (e.g., as indicated in the security token included in the application layer 302 information). The request authorizer 306 thus resolves the corresponding policy variables using these items of information included in the request context to determine whether the policy statement authorizes the request. Examples of other types of statements that can be used to restrict the use of temporary credentials to a particular virtual private network, to a particular compute instance, to a subnet range, etc., are shown elsewhere herein.

Figure 4:
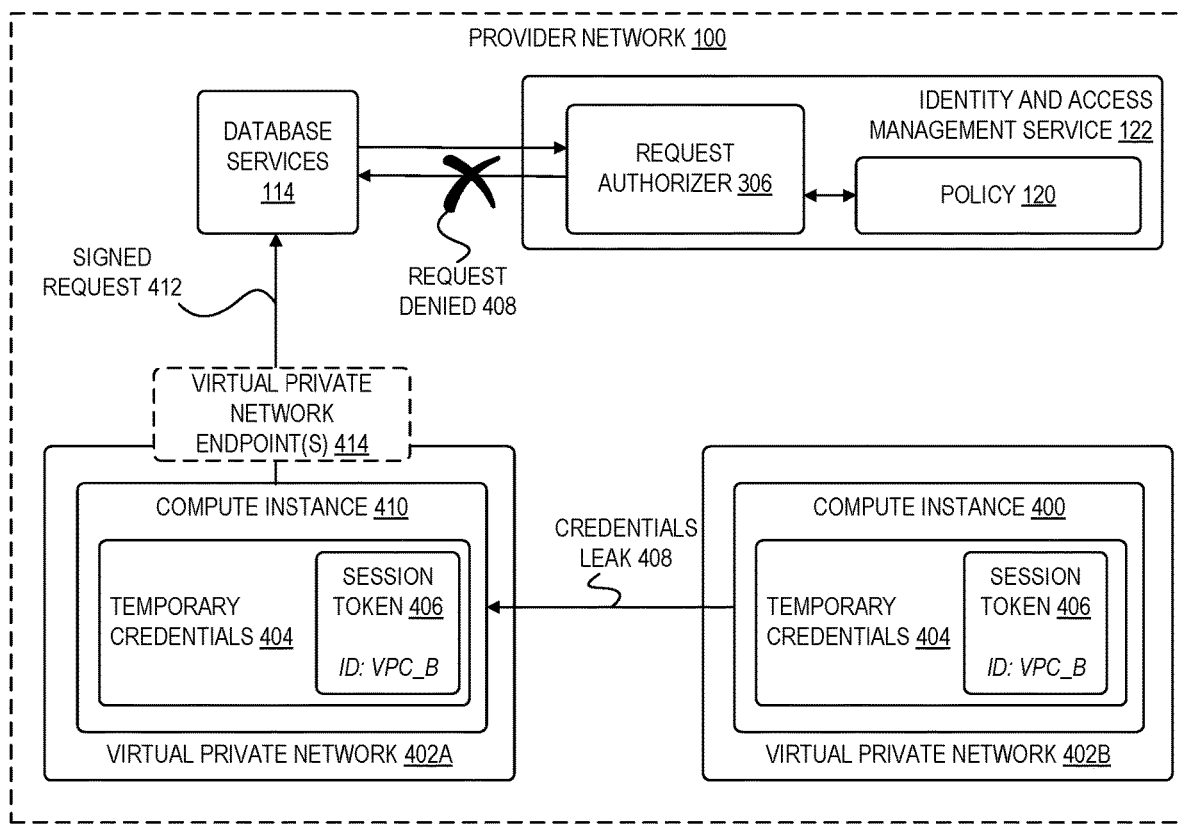
FIG. 4 is a diagram illustrating an example in which an identity and access management service blocks a request signed using temporary security credentials that were inadvertently leaked or stolen according to some examples.

FIG. 4 is a diagram illustrating an example in which an identity and access management service blocks a request signed using temporary security credentials that were inadvertently leaked or stolen according to some examples. In the example of FIG. 4, a compute instance 400 located in a virtual private network 402B obtains temporary credentials 404 including a session token 406. As shown, the session token 406 includes a network identifier associated with the compute instance 400 (e.g., an identifier of the virtual private network 402B of which the compute instance 400 is a part). At some point in time prior to the expiration of the temporary credentials 404, the credentials are leaked 408 and transferred to a compute instance 410 (e.g., a malicious user might transfer the credentials to a compute instance 410 and intends to use the credentials impersonate the owner of the credentials). In this example, the temporary credentials 404 are used to generate a signed request 412. The request 412 signed using the temporary credentials 404; however, if the request is routed through a virtual private network endpoint 414, or is routed by other intermediary network components, the request 412 include header information identifying virtual private network 402A or not identifying a virtual private network at all. The identity and access management service 122 evaluates the request 412, determines that the network identifier derived from the session token 406 does not match a network identifier derived from header information included with the signed request 412 and thus denies the request. In this manner, harm resulting from the credentials leak 408 is mitigated by restricting the use of the credentials to only the compute instance 400 or to the virtual private network 402B.

If a session token 406 includes an IP address of the compute instance to which the credentials are issued, issues may arise if the compute instance has its IP address updated (e.g., by another networking component in the same virtual private network). In some examples, a security token service 134 automatically regenerates temporary security credentials upon detecting that a compute instance has been assigned a new IP address, where the updated temporary security credentials include an updated session token including the new IP address of the computing resource. In other examples, the security token service 134 can reissue temporary security credentials responsive to detected changes in other network-related information associated with a set of temporary security credentials (e.g., a change to an identifier of a virtual private network, compute instance IP address, virtual private network endpoint address, etc.).

Figure 5:
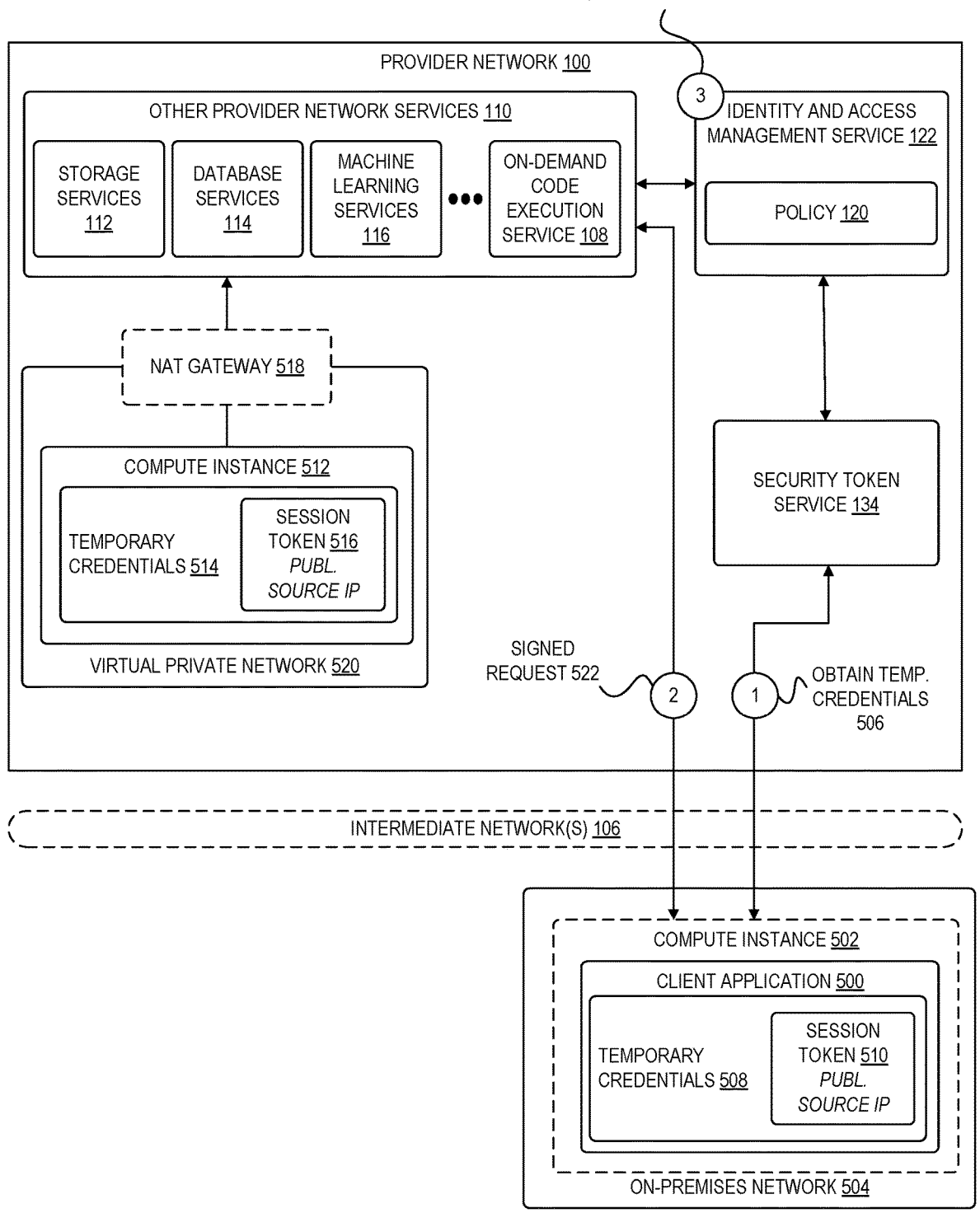
FIG. 5 is a diagram illustrating an example in which network metadata is encoded into temporary security credentials and used to authorize requests originating from inside or from outside of a cloud provider network according to some examples.

FIG. 5 is a diagram illustrating an example in which network metadata is encoded into temporary security credentials and used to authorize requests originating from inside or from outside of a cloud provider network according to some examples. At circle "1," a computing resource (e.g., a client application 500 running on a compute instance 502 located in a user's on-premises network 504) obtains 506 temporary security credentials 508 from the security token service 134. In some examples, the security token service 134 provides APIs for various actions that involve providing temporary security credentials (e.g., an API for assuming a role, obtaining a federation token, obtaining a session token, etc.), where the API requests can include a flag indicating that it is desired to include network metadata in the session token provided with the temporary credentials (e.g., the session token 510 included with the temporary credentials 508). In other examples, the security token service 134 includes the network metadata in generated session tokens by default. The network metadata included in the session token can include, for example, the public source IP address or any other available network metadata of the computing resource calling the API such as, for example, a user agent string, a TLS/SLS protocol and cipher suite (e.g., identified by a cipher suite string or other identifier), etc. As illustrated in FIG. 5, other compute instances 512 can similarly obtain temporary credentials 514 including a session token 516, where the network metadata encoded in the session token can include a public source IP address (e.g., associated with a NAT gateway 518 used to route traffic outside of the virtual private network 520 and possibly across the public internet).

In some examples, at circle "2," the client application sends a signed request 522 using the temporary credentials 508 and including the network metadata encoded in the session token 510. As the request transits the user's on-premises network 504, intermediate network(s) 106, and provider network 100, at least one intermediary network component adds or modifies header information associated with the request to identify a public source IP address of the client application 500. For example, one or more routers responsible for routing the traffic from the client application 500 to a receiving service of the cloud provider network 100 can add, to the network traffic, information identifying a public IP address associated with the request. In some examples, the signed request 522 can also include other types of network metadata added by the client application 500 or other components such as, for example, a user agent string, TLS/SLS protocol and cipher suite, etc.

At circle "3," in some examples, once the signed request 522 is received by a service of the cloud provider network 100, the service can cause the identity and access management service 122 to authorize 524 the request using network metadata included in the session token and request header information. In this example, a policy 120 is again manually created by a user or automatically created on behalf of the user and includes a statement involving a comparison of network metadata encoded in the session token 510 (e.g., a network identifier such as a public IP address, range of IP addresses, or other information or combinations thereof) with network metadata included with the signed request 522

(e.g., a network identifier of the requesting client application such as a public IP address, user agent string, etc., where such information is incorporated into a request context analyzed by the identity and access management service 122). Similar to the examples shown in FIGS. 1-4, the policy 120 can allow or deny requests based on a determination of whether the temporary credentials 508 were issued to a computing resource within the same boundaries as the one generating the signed request 522 (e.g., within the same local network as identified by the public source IP address, within a same range of IP addresses, by a same client application as identified by a combination of IP address, user agent string, etc.).

FIG. 6 is a flow diagram illustrating operations 600 of a method for operations of a method for authenticating a request including temporary security credentials by comparing information encoded in a session token with information included in a header of network traffic carrying the request according to some examples according to some examples. Some or all the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by identity and access management service 122 of the other figures.

The operations 600 include, at block 602, receiving, by an identity and access management service of a cloud provider network, a request to perform an action, wherein the request includes: temporary security credentials issued to a computing resource, wherein the temporary security credentials include a session token including a first network identifier associated with the computing resource, and header information including a second network identifier added by an intermediary network component that is separate from the computing resource.

The operations 600 further include, at block 604, identifying a policy associated with the request, wherein the policy includes a statement authorizing the request based on a comparison of the first network identifier and the second network identifier.

The operations 600 further include, at block 606, authorizing or denying the request to perform the action based on the comparison of the first network identifier and the second network identifier.

In some examples, the request is a first request, the temporary security credentials are first temporary security credentials, the computing resource is a first computing resource, the first network identifier identifies a first virtual private network, and wherein the method further comprises: receiving, by the identity and access management service, a second request to perform an action, wherein the second request is received from a second computing resource in a second virtual private network; and using the policy to authorize the second request, wherein authorizing the second request includes comparing identifiers included in a second session token and second header information included in the second request.

In some examples, the second network identifier identifies a virtual private network endpoint, and wherein the method further comprises identifying, by the identity and access management service, a virtual private network of the computing resource based on the second network identifier of the virtual private network endpoint.

In some examples, the temporary security credentials are first temporary security credentials, the computing resource is a first computing resource, the header information is first header information, wherein the identity and access management service provides the first temporary security credentials to the first computing resource based on the first computing resource assuming a first role defined by the identity and access management service, and wherein the operations further include: providing second temporary security credentials to a second computing resource based on the second computing resource assuming a second role; receiving a second request to perform an action; and authorizing, based on the policy, the second request to perform the action by comparing identifiers included in a session token of the second temporary security credentials and second header information included in the second request.

In some examples, the statement includes a first policy variable corresponding to a virtual private network from which the request originates and a second policy variable corresponding to a virtual private network to which the temporary security credentials were issued, wherein the first policy variable and the second policy variable are defined by the identity and access management service, and wherein the operations further include: resolving, by the identity and access management service, the first policy variable to the first network identifier based on the session token; and resolving, by the identity and access management service, the second policy variable to the second network identifier based on the header information.

In some examples, the operations further include providing, by the identity and access management service, policy variables including at least one of: a policy variable that resolves to an identifier of a virtual private network to which temporary security credentials were issued, a policy variable that resolves to a combination of a virtual private network to which temporary security credentials were issued and a private Internet Protocol (IP) address of the computing resource, or a policy variable that resolves to a combination of a virtual private network to which the temporary security credentials were issued and a public Internet Protocol (IP) address of the computing resource.

In some examples, the first network identifier includes: a private Internet Protocol (IP) address of the computing resource to which the temporary security credentials were issued, and an identifier of a virtual private network including the computing resource, and wherein the second network identifier includes: a private IP address of a source of the request, and an identifier of a virtual private network from which the request originates.

In some examples, the first network identifier is a private Internet Protocol (IP) address, and wherein the operations further include: determining that the computing resource has been assigned a new IP address; and issuing, by a security token service, updated temporary security credentials including an updated session token, wherein the updated session token includes the new IP address of the computing resource.

In some examples, the request is a first request, the temporary security credentials are first temporary security credentials, the header information is first header information, and wherein the operations further include: receiving a second request including: second temporary security credentials including a third network identifier, and second header information including a fourth network identifier;

determining, based on the policy, that the third network identifier and the fourth network identifier do not match; and denying the second request.

In some examples, the operations further include receiving a request to implement temporary security credential controls for an account of the cloud provider network associated with the computing resource; and generating, by the identity and access management service, the policy including the statement authorizing the request based on the comparison of the first network identifier and the second network identifier.

In some examples, the policy is a service control policy that applies to an organization of accounts of the cloud provider network, and wherein the computing resource obtains the temporary security credentials responsive to the computing resource assuming an identity that is associated with the organization.

In some examples, the computing resource is part of a network that is external to the cloud provider network, and wherein the first network identifier is a public Internet Protocol (IP) address or a range of public IP addresses associated with the computing resource.

In some examples, the operations further include receiving, from the computing resource, a request to obtain the temporary security credentials, wherein the computing resource is located in a network that is external to the cloud provider network, and wherein the request includes a flag instructing a security token service to encode network metadata including the first network identifier into the temporary security credentials; identifying the first network identifier based on the request; and sending, to the computing resource, the temporary security credentials, wherein the session token of the temporary security credentials includes the first network identifier.

Figure 7:
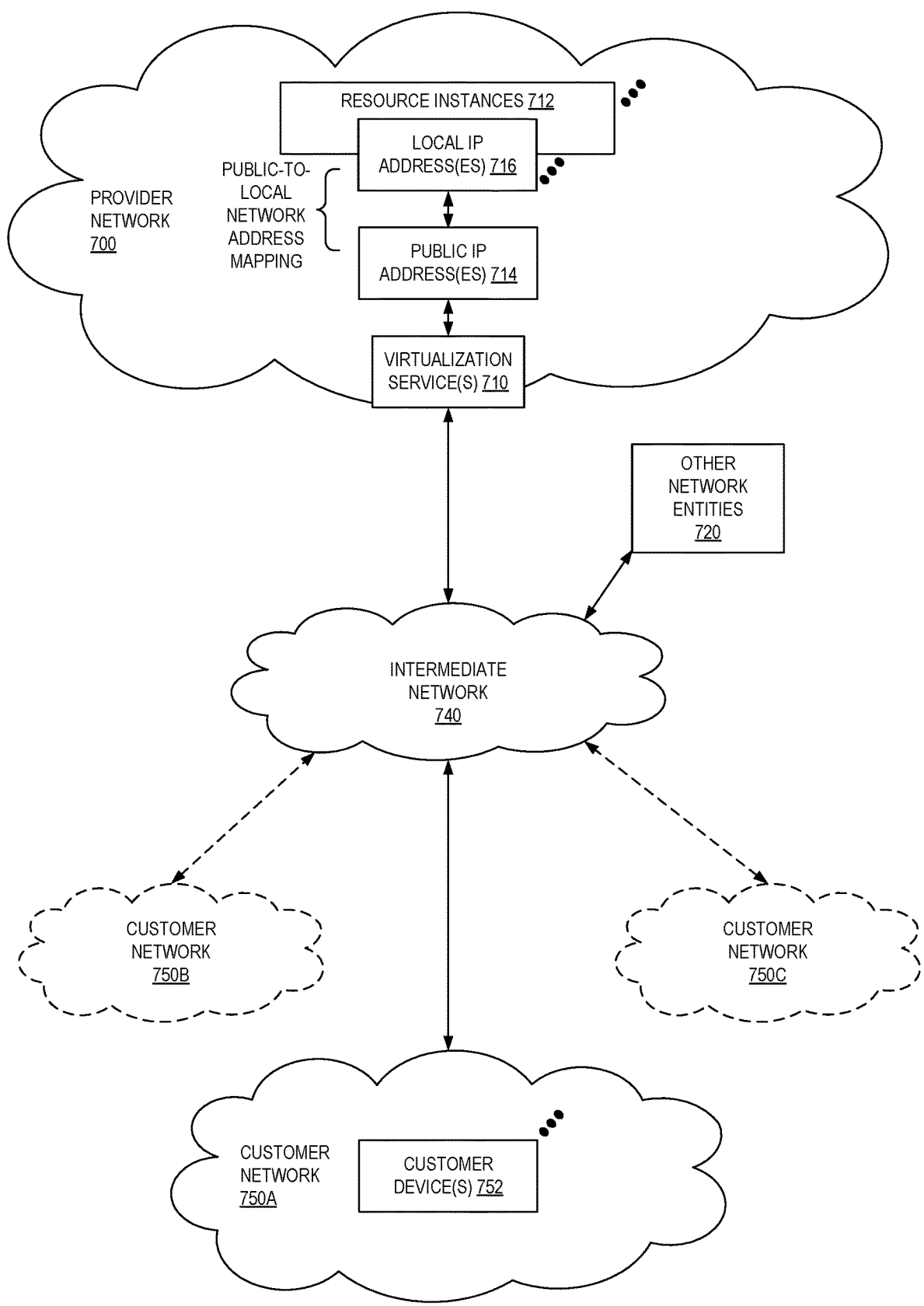
FIG. 7 illustrates an example provider network environment according to some examples.

FIG. 7 illustrates an example provider network (or "service provider system") environment according to some examples. A provider network 700 (which can be the same as provider network 100) can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
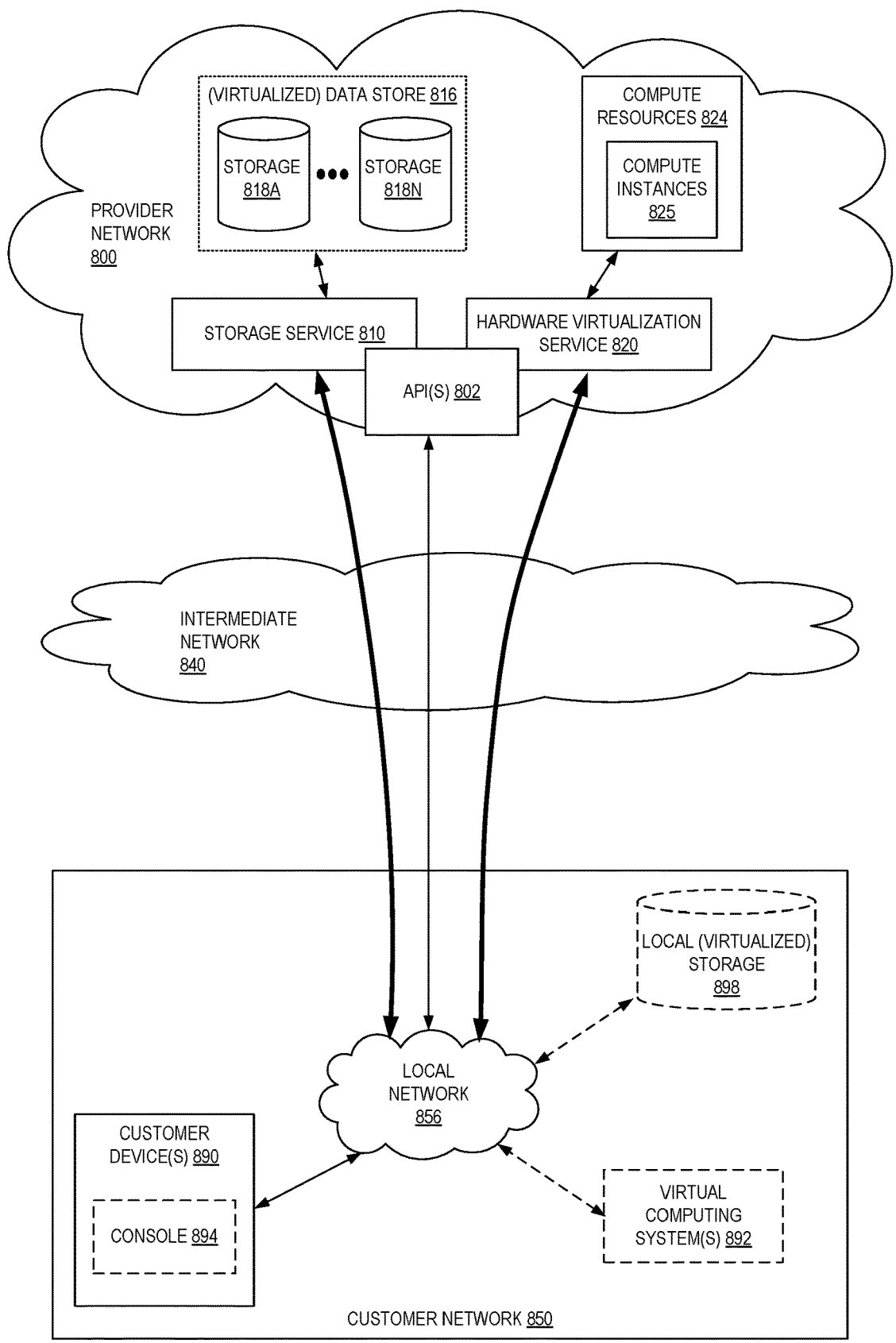
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 (which can be the same as provider network 100) can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Figure 9:
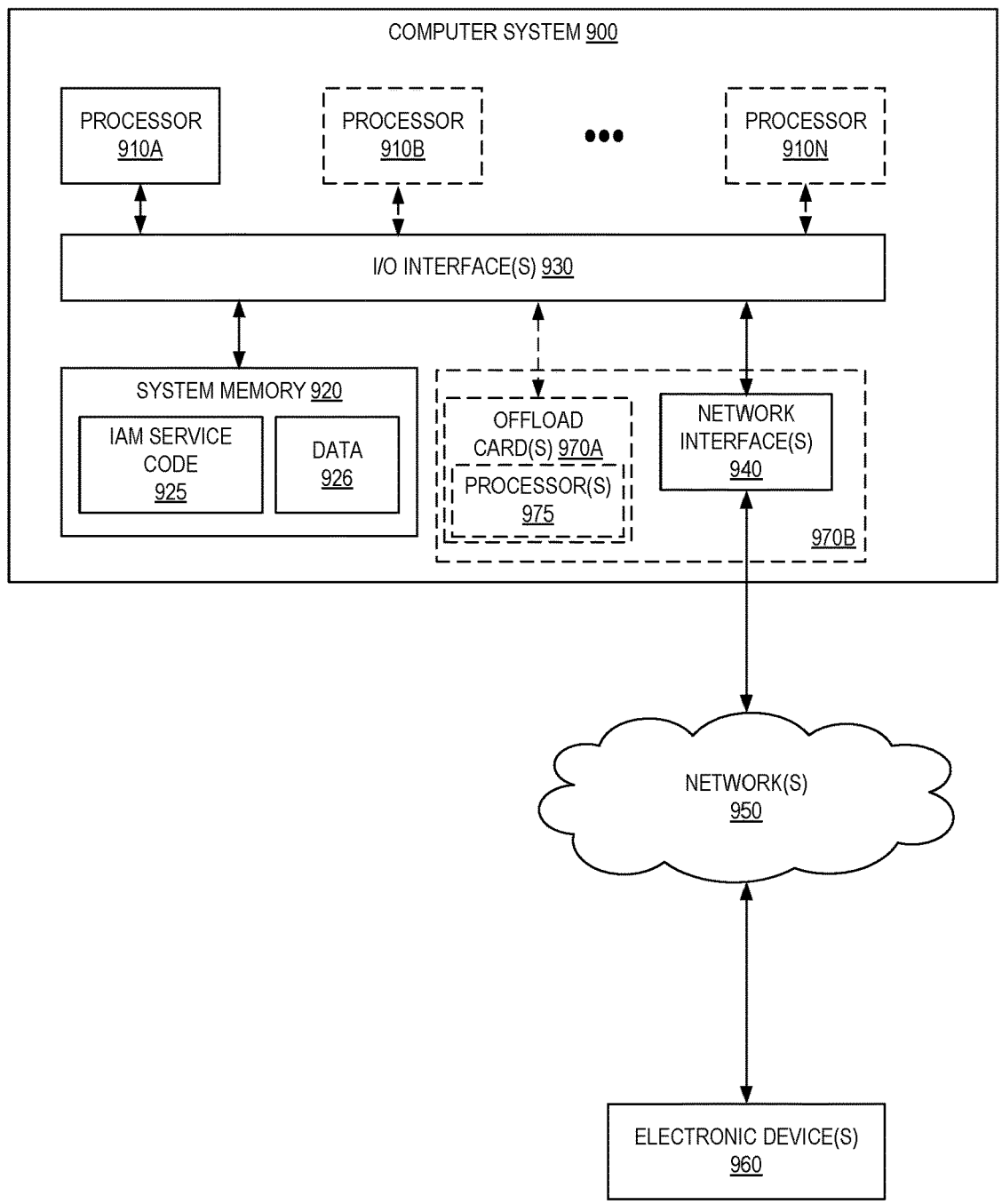
FIG. 9 is a block diagram illustrating an example computer system that can be used in some examples.

In some examples, a system that implements a portion or all of the techniques described herein can include a general-purpose computer system, such as the computer system 900 illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as identity and access management (IAM) service code 925 (e.g., executable to implement, in whole or in part, the identity and access management service 122) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and can not coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, by an identity and access management service of a cloud provider network, a request to perform an action, wherein the request includes:
   temporary security credentials issued to a computing resource associated with a virtual private network provided by the cloud provider network, wherein the temporary security credentials include a session token including a first identifier of the virtual private network, and wherein the first identifier of the virtual private network is encoded in the session token by a service issuing the temporary security credentials, and header information including a second identifier of the virtual private network, wherein the header information is added to the request by a virtual private network endpoint used to route network traffic outside of the virtual private network;
identifying a policy associated with the request, wherein the policy includes a statement indicating that the request is to be authorized if the first identifier and the second identifier identify a same virtual private network;
determining that the first identifier and the second identifier identify the same virtual private network; and
authorizing the request to perform the action.

2. The computer-implemented method of claim 1, wherein the request is a first request, the temporary security credentials are first temporary security credentials, the computing resource is a first computing resource, the virtual private network is a first virtual private network, and wherein the method further comprises:
receiving, by the identity and access management service, a second request to perform an action, wherein the second request is received from a second computing resource in a second virtual private network; and
using the policy to authorize the second request, wherein authorizing the second request includes comparing identifiers included in a second session token and second header information included in the second request.

3. The computer-implemented method of claim 1, wherein the second identifier of the virtual private network identifies the virtual private network endpoint, and wherein the method further comprises identifying, by the identity and access management service, the virtual private network based on the second identifier of the virtual private network endpoint.

4. A computer-implemented method comprising:
obtaining, by an identity and access management service of a cloud provider network, a request to perform an action, wherein the request includes:
temporary security credentials issued to a computing resource, wherein the temporary security credentials include a session token including a first network identifier associated with the computing resource, and
header information including a second network identifier added by an intermediary network component that is separate from the computing resource;
identifying a policy associated with the request, wherein the policy includes a statement authorizing the request based on a comparison of the first network identifier and the second network identifier; and
authorizing the request to perform the action based on the comparison of the first network identifier and the second network identifier.

5. The computer-implemented method of claim 4, wherein the request is a first request, the temporary security credentials are first temporary security credentials, the computing resource is a first computing resource, the first network identifier identifies a first virtual private network, and wherein the method further comprises:
obtaining, by the identity and access management service, a second request to perform an action, wherein the second request is received from a second computing resource in a second virtual private network; and
using the policy to authorize the second request, wherein authorizing the second request includes comparing identifiers included in a second session token and second header information included in the second request.

6. The computer-implemented method of claim 4, wherein the second network identifier identifies a virtual private network endpoint, and wherein the method further comprises identifying, by the identity and access management service, a virtual private network of the computing resource based on the second network identifier of the virtual private network endpoint.

7. The computer-implemented method of claim 4, wherein the temporary security credentials are first temporary security credentials, the computing resource is a first computing resource, the header information is first header information, wherein the identity and access management service provides the first temporary security credentials to the first computing resource based on the first computing resource assuming a first role defined by the identity and access management service, and wherein the method further comprises:
providing second temporary security credentials to a second computing resource based on the second computing resource assuming a second role;
receiving a second request to perform an action; and
authorizing, based on the policy, the second request to perform the action by comparing identifiers included in a session token of the second temporary security credentials and second header information included in the second request.

8. The computer-implemented method of claim 4, wherein the statement includes a first policy variable corresponding to a virtual private network from which the request originates and a second policy variable corresponding to a virtual private network to which the temporary security credentials were issued, wherein the first policy variable and the second policy variable are defined by the identity and access management service, and wherein the method further comprises:
resolving, by the identity and access management service, the first policy variable to the first network identifier based on the session token; and
resolving, by the identity and access management service, the second policy variable to the second network identifier based on the header information.

9. The computer-implemented method of claim 4, further comprising providing, by the identity and access management service, policy variables including at least one of: a policy variable that resolves to an identifier of a virtual private network to which temporary security credentials were issued, a policy variable that resolves to a combination of a virtual private network to which temporary security credentials were issued and a private Internet Protocol (IP) address of the computing resource, or a policy variable that resolves to a combination of a virtual private network to which the temporary security credentials were issued and a public Internet Protocol (IP) address of the computing resource.

10. The computer-implemented method of claim 4, wherein the first network identifier includes: a private Internet Protocol (IP) address of the computing resource to which the temporary security credentials were issued, and an identifier of a virtual private network including the computing resource, and wherein the second network identifier includes: a private IP address of a source of the request, and an identifier of a virtual private network from which the request originates.

11. The computer-implemented method of claim 4, wherein the first network identifier is a private Internet Protocol (IP) address, and wherein the method further comprises:
   determining that the computing resource has been assigned a new IP address; and
   issuing, by a security token service, updated temporary security credentials including an updated session token, wherein the updated session token includes the new IP address of the computing resource.

12. The computer-implemented method of claim 4, wherein the request is a first request, the temporary security credentials are first temporary security credentials, the header information is first header information, and wherein the method further comprises:
   obtaining a second request including: second temporary security credentials including a third network identifier, and second header information including a fourth network identifier;
   determining, based on the policy, that the third network identifier and the fourth network identifier do not match; and
   denying the second request.

13. The computer-implemented method of claim 4, further comprising:
   obtaining a request to implement temporary security credential controls for an account of the cloud provider network associated with the computing resource; and
   generating, by the identity and access management service, the policy including the statement authorizing the request based on the comparison of the first network identifier and the second network identifier.

14. The computer-implemented method of claim 4, wherein the policy is a service control policy that applies to an organization of accounts of the cloud provider network, and wherein the computing resource obtains the temporary security credentials responsive to the computing resource assuming an identity that is associated with the organization.

15. The computer-implemented method of claim 4, wherein the computing resource is part of a network that is external to the cloud provider network, and wherein the first network identifier is a public Internet Protocol (IP) address or a range of public IP addresses associated with the computing resource.

16. The computer-implemented method of claim 4, further comprising:
   receiving, from the computing resource, a request to obtain the temporary security credentials, wherein the computing resource is located in a network that is external to the cloud provider network, and wherein the request includes a flag instructing a security token service to encode network metadata including the first network identifier into the temporary security credentials;
   identifying the first network identifier based on the request; and
   sending, to the computing resource, the temporary security credentials, wherein the session token of the temporary security credentials includes the first network identifier.

17. A system comprising:
   a first one or more electronic devices to implement an identity and access management service in a cloud provider network wherein the identity and access management service includes instructions that upon execution cause the identity and access management service to:
      receive a request to perform an action, wherein the request includes:
         temporary security credentials issued to a computing resource associated with a virtual private network provided by the cloud provider network, wherein the temporary security credentials include a session token including a first identifier of the virtual private network, and wherein the first identifier of the virtual private network is encoded in the session token by a service issuing the temporary security credentials, and
         header information including a second identifier of the virtual private network, wherein the header information is added to the request by a virtual private network endpoint used to route network traffic outside of the virtual private network;
      identify a policy associated with the request, wherein the policy includes a statement indicating that the request is to be authorized if the first identifier and the second identifier identify a same virtual private network;
      determine that the first identifier and the second identifier identify the same virtual private network; and
      authorize the request to perform the action; and
   a second one or more electronic devices to implement a security token service in the cloud provider network, wherein the security token service includes instructions that upon execution cause the security token service to:
      generate the temporary security credentials including the session token; and
      send the temporary security credentials to the computing resource.

18. The system of claim 17, wherein the request is a first request, the temporary security credentials are first temporary security credentials, the computing resource is a first computing resource, the virtual private network is a first virtual private network, and wherein the identity and access management service further includes instructions that upon execution cause the identity and access management service to:
   receive, a second request to perform an action, wherein the second request is received from a second computing resource in a second virtual private network; and
   use the policy to authorize the second request, wherein authorizing the second request includes comparing identifiers included in a second session token and second header information included in the second request.

19. The system of claim 17, wherein the second identifier of the virtual private network identifies the virtual private network endpoint, and wherein the identity and access management service further includes instructions that upon execution cause the identity and access management service to identify, by the identity and access management service, the virtual private network based on the second identifier of the virtual private network endpoint.

20. The system of claim 17, wherein the temporary security credentials are first temporary security credentials, the computing resource is a first computing resource, wherein the identity and access management service provides the first temporary security credentials to the first computing resource based on the first computing resource assuming a first role defined by the identity and access management service, and wherein the identity and access management service further includes instructions that upon execution cause the identity and access management service to:

provide second temporary security credentials to a second computing resource based on the second computing resource assuming a second role;
receive a second request to perform an action; and
authorize, based on the policy, the second request to perform the action by comparing identifiers included in a session token of the second temporary security credentials and second header information included in the second request.

* * * * *